(12) United States Patent
Old

(10) Patent No.: US 7,039,145 B2
(45) Date of Patent: May 2, 2006

(54) CONTROL LOOP APPARATUS AND METHOD THEREFOR

(75) Inventor: Gordon Old, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 483 days.

(21) Appl. No.: 10/375,229

(22) Filed: Feb. 27, 2003

(65) Prior Publication Data

US 2004/0170243 A1    Sep. 2, 2004

(51) Int. Cl.
H04L 25/00 (2006.01)
H04L 25/40 (2006.01)
H04L 7/00 (2006.01)
(52) U.S. Cl. .................................. 375/372; 710/52
(58) Field of Classification Search ............ 375/372, 375/377, 225, 354, 355; 714/707; 710/52; 370/503
See application file for complete search history.

(56) References Cited

U.S. PATENT DOCUMENTS

| 4,819,226 A | * | 4/1989 | Beckner et al. | 370/458 |
| 4,833,671 A | * | 5/1989 | Beckner et al. | 370/429 |
| 4,833,673 A | * | 5/1989 | Chao et al. | 370/537 |
| 4,941,156 A | * | 7/1990 | Stern et al. | 375/372 |
| 5,195,088 A | * | 3/1993 | Urbansky | 370/545 |
| 5,263,056 A | * | 11/1993 | Urbansky | 375/363 |
| 5,327,430 A | * | 7/1994 | Urbansky | 370/465 |
| 6,052,748 A | * | 4/2000 | Suominen et al. | 710/57 |
| 6,519,722 B1 | * | 2/2003 | Wiggins | 714/707 |
| 6,687,255 B1 | * | 2/2004 | Holm et al. | 370/412 |
| 6,876,678 B1 | * | 4/2005 | Chow et al. | 370/538 |

* cited by examiner

Primary Examiner—Jean B. Corrielus

(57) ABSTRACT

In the field of optical communications, the need to remove jitter from a Synchronous Digital Hierarchy (SDH) or Synchronous Optical NETwork (SONET) datastream is recognized. Consequently, the present invention provides a First-In-First-Out (FIFO) buffer having a read-out clock frequency that is controlled in response to a depth error of the FIFO buffer. The control of the read-out clock frequency is achieved by a hardware control loop coupled to the FIFO buffer. The period of the control loop is a product of the frequency at which the depth error of the FIFO buffer is acquired and another factor. The another factor is the number of states of logic employed by the control loop raised to an integer power.

26 Claims, 2 Drawing Sheets

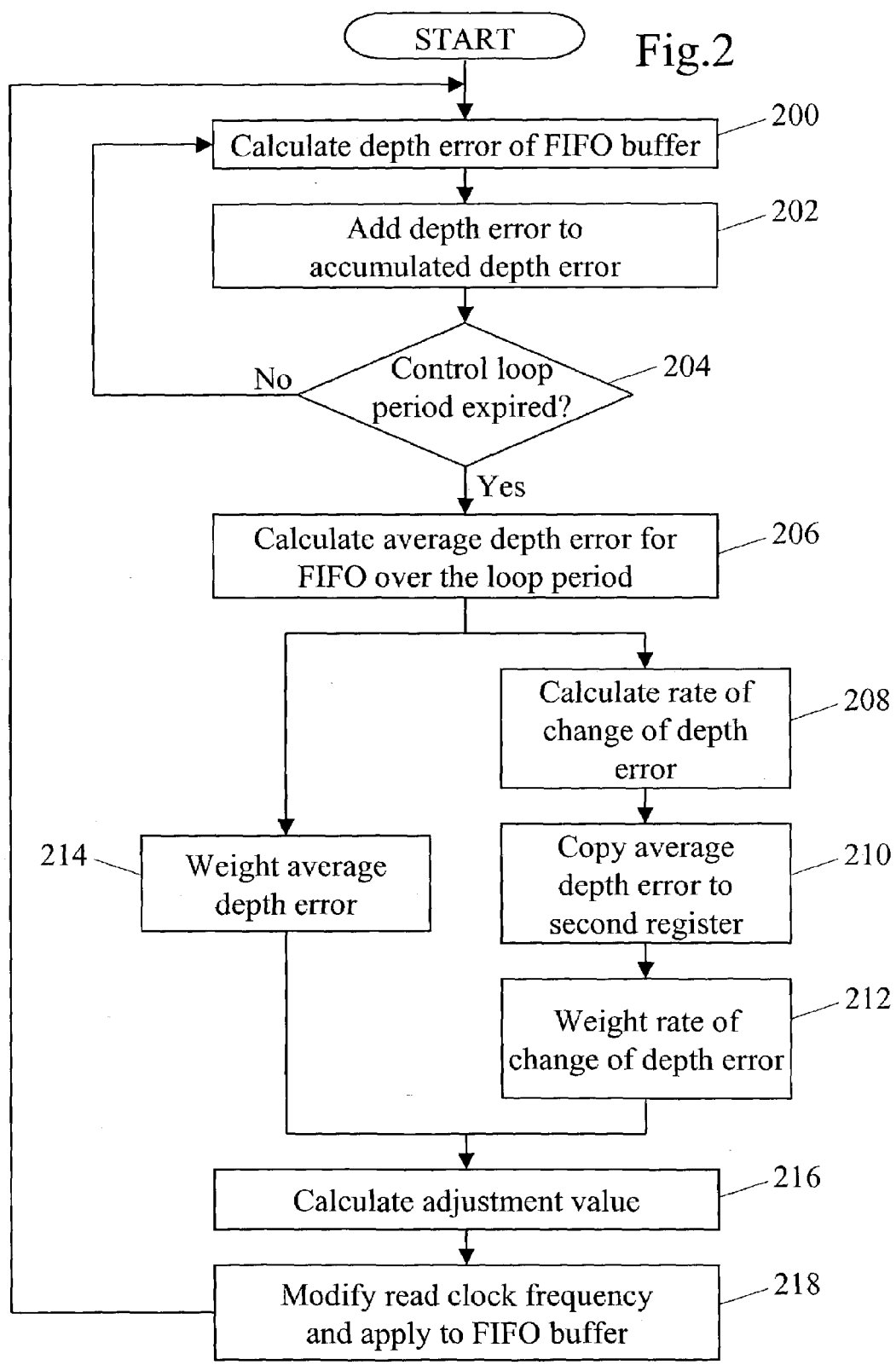

CONTROL LOOP APPARATUS AND METHOD THEREFOR

FIELD OF THE INVENTION

The present invention relates, in general, to a control loop apparatus of the type, for example, employed to remove reduce from a received data stream. The present invention also relates, in general, to a method of adjusting a read-out data rate for a First-In-First-Out (FIFO) buffer.

DESCRIPTION OF THE BACKGROUND ART

One American National Standards Institute (ANSI) standard for synchronous data transmission on optical media is known as Synchronous Optical NETwork (SONET), and defines a hierarchy of Optical Carrier (OC) levels and electrically equivalent Synchronous Transport Signals (STSs) for an optical communications system. The international equivalent to SONET is Synchronous Digital Hierarchy (SDH). In contrast, Plesiosynchronous Digital Hierarchy (PDH) has traditionally been employed.

A SONET datastream is arranged in frames of nine equal-length segments. Each frame can be depicted as nine rows and 90 columns, each "cell" being one byte in length. Each SONET segment comprises 3 Transport Overhead (TOH) bytes. Consequently, the first three columns constitute TOH bytes comprising information regarding, for example, the frame's destination. The remaining columns constitute a Synchronous Payload Envelope (SPE) for carrying payload data such as voice, high speed data and video.

As mentioned above, the SONET standard defines OC levels and electrically equivalent STSs for the fibre-optic based transmission hierarchy. In order to carry many signals of different capacities through a single optical hierarchy, a byte-interleaved multiplexing scheme is used, which simplifies multiplexing and provides end-to-end network management. In order to multiplex, a lowest level, or base, signal must first be generated. The base signal is known as the STS Level-1 (STS-1/OC-1) and corresponds to a bit rate of 51.84 Mbits/s. Higher level signals can be generated from integer multiples of the byte-interleaved STS-1 signal, such as OC-3 (155.2 Mbps), OC-12 (622.08 Mbps) and OC-48 (2488.32 Mbps) The SONET STS-1 base signal can be built by multiplexing signals of a lower bit rate, such signals being known as tributaries. The individual tributaries can each carry a different payload having a separate destination. Furthermore, several SONET base signals can be multiplexed to form SONET signals having a higher bit rate as mentioned above.

When multiplexing individual tributaries of a lower bit rate to form a SONET STS-1 signal, it is often necessary to map the asynchronous bit rate of the tributary to the higher bit rate of the SONET STS-1 signal using bit justification or 'stuffing' techniques. The process of mapping (when multiplexing) and the subsequent de-mapping (when demultiplexing) of individual tributaries can introduce timing irregularities into a part of the datastream that constitutes the payload data.

In relation to the discrete-time aspects of SONET, timing irregularities associated with the process of mapping are known, and are referred to as "jitter". SONET signals are therefore very "bursty", i.e. the data stream can be transmitted in bursts interleaved by gaps of, for example, 3 bytes of redundant data.

Known solutions for reducing jitter employ a First-In-First Out (FIFO) buffer to smooth out transmitted SONET signals by equalising the gaps between units of data, such as bytes of the payload data. A FIFO buffer is typically a dual ported Random Access Memory (RAM) having a write-only port and a read-only port. Data-in having jitter, and therefore timing irregularities, is written into an available empty memory location and data is read out from the FIFO buffer in the order that the data was written in.

The data-out rate of the FIFO buffer is determined by a frequency of a read clock of the FIFO buffer. In effect, the FIFO buffer smoothes the flow of bits that arrive "early" or "late" due to the effects of the timing irregularities so as to achieve a desired constant flow of bits. The FIFO buffer subsequently resends the received bits with the correct timing based on a system clock. Since the function of the FIFO buffer is to maintain the read-out rate of data at as constant a rate as possible within the constraints of a discrete-time system, the FIFO buffer can be selected to receive data bursts of different widths, thereby accommodating, for example, both bit- and byte-wide architectures.

For efficient operation of the FIFO buffer, it is important to ensure that the FIFO buffer never over-fills or empties completely. Therefore despite the flow of data into the FIFO buffer being bursty, the flow of data out from the FIFO buffer must be controlled by the read clock so as to ensure that the data out is not only smooth and jitter free, but also controlled in a manner to ensure that the FIFO buffer is never full or empty. Preferably, the FIFO buffer is maintained at a midway point, i.e. half full. With knowledge of the mapping function employed, it is possible to calculate the minimum necessary depth of the FIFO buffer so as to ensure that no under- or over-flow events occur when the FIFO buffer is in a steady-state. It therefore follows that the read rate of the FIFO buffer needs to be carefully controlled.

A known solution for controlling the read clock frequency of a FIFO buffer employs a first order control loop apparatus coupled to the FIFO buffer. For each control loop period, the apparatus determines a depth error of the FIFO buffer. The depth of the FIFO buffer is defined in terms of the integer number of memory locations of the FIFO buffer being used at the time of measurement. The depth error of the FIFO buffer is defined as the difference between the depth of the FIFO buffer and the median point of the FIFO buffer. Hence, the range of possible depth errors is the range of positive and negative numbers relative to half the full depth of the FIFO buffer. If the FIFO buffer is determined to be close to capacity, the control loop apparatus initiates an increase in the read clock frequency of the FIFO buffer causing the rate of data leaving the FIFO buffer to increase. Conversely, if the depth of the FIFO buffer is determined to be close to empty, the control loop apparatus initiates a decrease in the read clock frequency of the FIFO buffer.

However, such known control loop apparatus can suffer from errors due to sampling if the frequency of the control loop is much less than the frequency of jitter in the incoming data stream written into the FIFO buffer. Therefore, on determining the depth of the FIFO buffer, it can take, for example, approximately 1 ms for the control loop apparatus to program a revised read clock frequency for the FIFO buffer so as to increase or decrease the flow of data out of the FIFO buffer as necessary. As such, if the depth of the FIFO buffer is read immediately after a payload has been written into the FIFO buffer and the control loop subsequently determines that the FIFO buffer is nearly full, the read clock frequency will be programmed so as to increase. However, during the time taken for the control loop apparatus to complete one period, the data-in flow rate may reduce significantly to a rate much less than the adjusted rate of data read out from the FIFO. Consequently, the FIFO buffer may empty (or, if the opposite occurs, fill) during the control loop period leading to an inefficient jitter reduction performance of the FIFO buffer.

According to a first aspect of the present invention, there is provided a control loop apparatus having a control loop period associated therewith and employing n-state logic, the apparatus comprising: a first processing element capable of acquiring data at a rate determined by a predetermined clock signal, the data corresponding to a parameter to be controlled; further processing elements arranged to generate, when in use, a control signal in response to the acquired data; wherein the control loop period, is a mathematical product of a period of the clock signal and a constant, the constant being the number of logic states of the n-state logic raised to a first integer power.

The first processing element may be further arranged to sum, or accumulate, the acquired data over a period of the control loop, thereby calculating an accumulated value. In particular, the first processing element and the further processing elements may be arranged to manipulate the bits constituting the accumulated value, thereby averaging the accumulated value over the period of the control loop.

The first processing element and the further processing elements may be arranged to shift the bits constituting the accumulated value, thereby averaging the accumulated value over the period of the control loop. Alternatively, the first processing element and the further processing elements may be arranged to truncate the bits constituting the accumulated value, thereby substantially averaging the accumulated value over the period of the control loop.

The further processing elements may be arranged to provide second order control.

The further processing elements may be arranged to calculate a rate of change of the accumulated value. In particular, the further processing elements may be arranged to apply a derivative gain to the calculated rate of change of the accumulated value. In one embodiment, the derivative gain corresponds to substantially the number of logic states raised to a second integer power.

The further processing elements may be arranged to apply a proportional gain to an average of the accumulated value, the average being over the control loop period. For example, the proportional gain, may correspond to substantially the number of logic states raised to a third integer power.

The parameter to be controlled may be a depth error of a First-In-First-Out (FIFO) buffer The control signal may be used to control a period of a clocking signal According to a second aspect of the present invention, there is provided in a control loop apparatus having a control loop period associated therewith and employing n-state logic, a method of operating the control loop apparatus, the method comprising the steps of: acquiring data at a rate determined by a predetermined clock signal, the data corresponding to a parameter to be controlled, generating a control signal in response to the acquired data; and setting the control loop period to be a mathematical product of a period of the clock signal and a constant, the constant being the number of logic states of the n-state logic raised to a first integer power The method may further comprise the step of summing, or accumulating, the acquired data over a period of the control loop, thereby calculating an accumulated value. In particular, the method may further comprise the step of manipulating the bits constituting the accumulated value, thereby averaging the accumulated value over the period of the control loop.

The method may further comprise the step of shifting the bits constituting the accumulated value, thereby averaging the accumulated value over the period of the control loop. Alternatively, the method may further comprise the step of truncating the bits constituting the accumulated value, thereby substantially averaging the accumulated value over the period of the control loop.

The method may further comprise the step of providing second order control.

The method may further comprise the step of calculating a rate of change of the accumulated value. In particular, the method may further comprise the step of applying a derivative gain to the calculated rate of change of the accumulated value. For example, the derivative gain may correspond to substantially the number of logic states raised to a second integer power.

The method may further comprise the step of applying a proportional gain to an average of the accumulated value, the average being over the period of the control loop. In particular, the proportional gain may correspond to substantially the number of logic states raised to a third integer power.

The parameter to be controlled may be a depth error of a First-In-First-Out (FIFO) buffer.

The method may further comprise the step of using the control signal to control a period of a clocking signal.

It is thus possible to provide a control loop apparatus, and a method of controlling a read clock frequency, that are capable of supporting, in hardware, the speed of calculation required toy ensure that any hysteresis between the adaptation of the read clock frequency and the changes in the parameter to be controlled by the control loop apparatus is not detrimental to the control of the parameter. Consequently, in the context of controlling a depth error of a FIFO buffer, the control of the read clock frequency is sufficiently fast to follow sufficiently closely changes to the depth error. Further, by selecting integer powers of the number of states of logic, for example integer powers of 2, the input signal can be averaged in a computationally efficient manner through the use of bit-shifting techniques or truncation. The complexity of the hardware constituting the control loop apparatus is therefore simplified considerably. Additionally, the use of integer powers of the number of logic levels as weights also simplifies the hardware required in order to achieve multiplication. It is therefore possible to implement a second order control loop in hardware without the associated expected circuitry complexity to control the flow of high-speed data streams. Consequently, the cost of manufacture of the control loop apparatus is reduced.

BRIEF DESCRIPTION OF THE DRAWINGS

At least one embodiment of the present invention will now be described, by way of example only, with reference to the accompanying drawings, in which:

FIG. 2 is a flow chart of a method of operation of the control loop apparatus of FIG. 1.

DETAILED DESCRIPTION OF THE EXEMPLARY EMBODIMENTS

Figure 1:
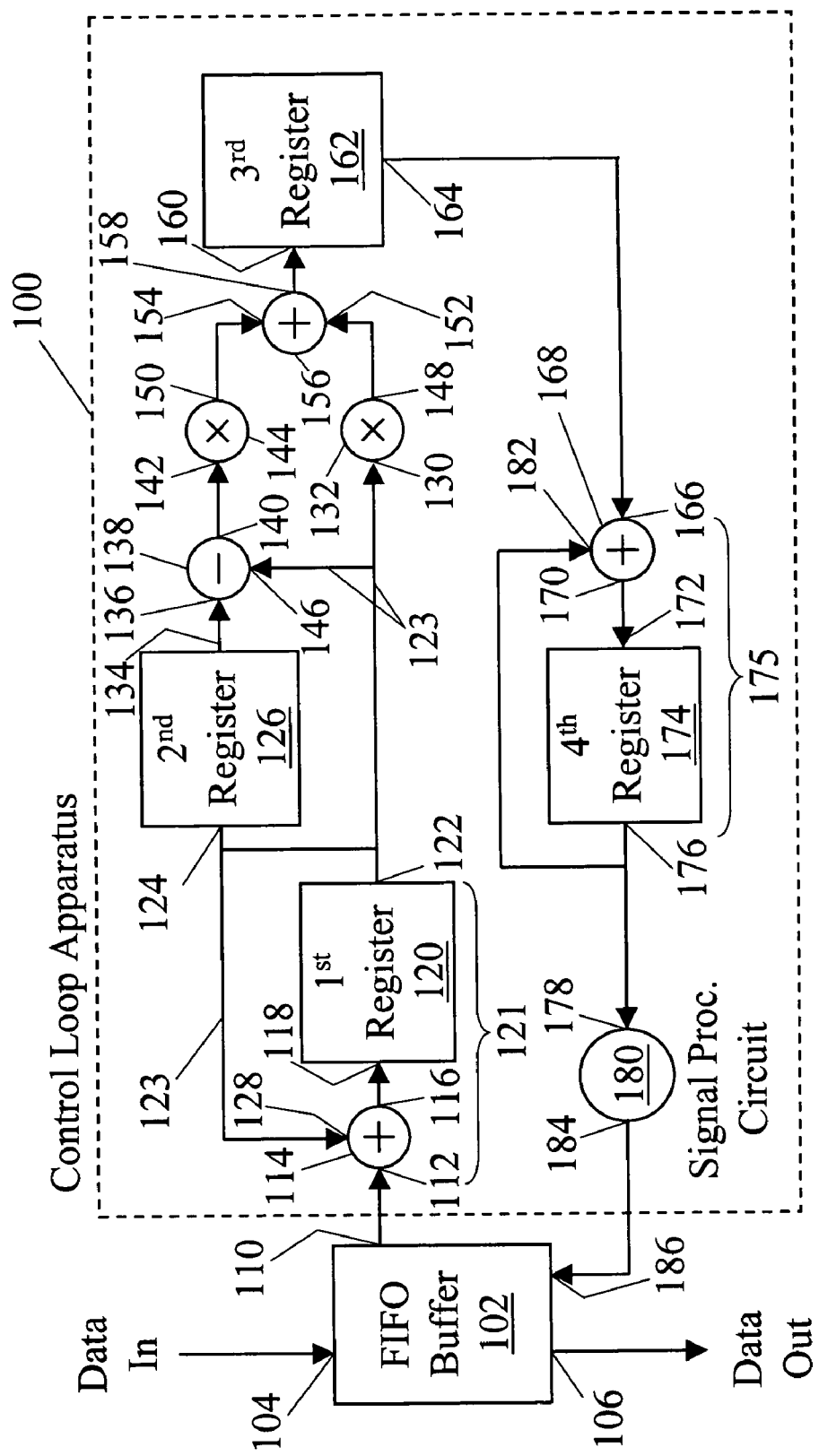
FIG. 1 is a schematic diagram of a control loop apparatus according to a first embodiment of the present invention.

Referring to FIG. 1, a control loop apparatus 100 and a dual ported FIFO buffer 102 are implemented in a Field Programmable Gate Array (FPGA), the control loop apparatus 100 being coupled to the dual ported FIFO buffer 102 for controlling a parameter, such as a read-out rate of data from the FIFO buffer 102. Alternative implementations of the control loop apparatus 100 are also envisaged, for example, in an Application Specific Integrated Circuit (ASIC).

The FIFO buffer 102 comprises a write-only port 104 for receiving an incoming data stream representative of, for example, a SONET signal having high jitter, and a read-only port 106 for reading the data stream out of the FIFO buffer 102 with a reduction in jitter in response to a read-out signal.

An output port 110 of FIFO buffer 102 is coupled to a first input port 112 of a first adder 114. An output port 116 of the first adder 114 is coupled to an input port 118 of a first register 120. Together, the first adder 114 and the first register 120 constitute a first accumulator 121. An output port 122 of the first register 120 is coupled to an input port 124 of a second register 126, a second port 128 of the first adder 114, and an input port 130 of a first multiplication unit 132 via the databus 123. The exact connection of the databus 123 between the above-mentioned elements will now be described below.

In this example, lines of the databus corresponding to given bit positions at the output port 122 of the first register 120 are coupled to the input ports 124, 130 of the second register 126 and the first multiplication unit 132 in a bit-translated manner, for example using a hard-wired barrel shifter, so as to effectively bit-shift the data communicated from the first register 120 via the databus 123. Consequently, a bit position "p" at the output port 122 of the first register 120 is coupled to a bit position "p+n" at the input ports 124, 130 of the second register 126 and the first multiplication unit 132 by a respective line of the databus 123. In contrast, with respect to the second port 128 of the first adder 114, the lines of the databus 123 coupled to the second port 128 correspond to the same bit positions at the output port 122 of the first register 120, i.e. not in a bit-translated manner. An alternative to the above bit-shifting connection technique is to decouple one or more line of the databus 123, corresponding to one or more least significant bit, thereby effectively truncating data communicated through the databus 123. A further alternative, is to employ floating point arithmetic and shift the exponent of the data communicated from the first register 120.

An output port 134 of the second register 126 is also coupled to a first input port 136 of a subtractor 138, an output port 140 of the subtractor 138 being coupled to a first input port 142 of a second multiplication unit 144. The output port 122 of the first register 120 and the input port 130 of the first multiplication unit 132 are also coupled to a second input port 146 of the subtractor 138.

When necessary, the circuit of the control loop apparatus 100 can be further simplified by coupling the first register 120 and the subtractor 138 directly to the second adder 156 and employing one of the bit shifting, truncating or exponent translating techniques in respect of an aggregate multiplication or division, thereby avoiding use of the first and second multiplication units 132, 144.

An output port 148 of the first multiplication unit 132 and an output port 150 of the second multiplication unit 144 are respectively coupled to a first input port 152 and a second input port 154 of a second adder 156. An output port 158 of the second adder 156 is coupled to a first input port 160 of a third register 162. An output port 164 of the third register 162 is coupled to an input port 166 of a third adder 168, an output port 170 of the third adder 168 being coupled to an input port 172 of a fourth register 174. Together, the fourth register 174 and the third adder 168 constitute a second accumulator 175.

An output port 176 of the fourth register 174 is couple to an input port 178 of a read-out signal processing circuit 180 and a second input port 182 of the third adder 168. The read-out signal processing circuit 180 comprises a Direct Digital Synthesizer (DDS—not shown), such as a Pulse-Output DDS. An output port 184 of the read-out signal processing circuit 180 is coupled to an input port 186 of the FIFO buffer 102.

In operation, and with reference to FIG. 2, a data stream is received by the FIFO buffer 102 by way of the write-only port 104 at a transmitted clock frequency. The data stream received by the FIFO buffer 102 is subject to a degree of jitter due to the varying gaps between units of data constituting the payload of the datastream.

A depth error value (in units of numbers of memory locations occupied) for the FIFO buffer 102 is generated by the FIFO buffer 102 at a rate determined, in discrete time, by a predetermined clock signal, in this example a signal from a system clock (step 200), the depth error value being made readable at the output port 110 of the FIFO buffer 102. The FIFO buffer 102 is a circular buffer in this example and has a read pointer and a write pointer. The FIFO buffer 102 is configured so that the FIFO buffer 102 can not under-run or over-run, i.e. the read pointer can not "wrap round" past the write pointer and vice-versa.

In this example, the system clock is a clock, such as an 80 MHz clock, that is programmed into the FPGA and is independent of the clock associated with the datastream. In order to synthesize various frequencies, clock enable lines (not shown) are used, thereby avoiding metastabilities and allowing the whole circuit to operate in discrete time.

On each cycle of the system clock, the calculated depth error is added to the accumulator 121 (step 202). This process is repeated until one control loop period has elapsed (step 204), the control loop period being the amount of time the control loop apparatus 100 takes between successive adjustments to the parameter to be controlled.

For mathematical, and hence computational, convenience, the control loop period is chosen to be an integer power of 2 (i.e. 2, 4, 8, 16 . . . ) times longer than the frequency of the system clock. It is thus possible to calculate an average depth error value (step 206) by performing a bit-shifting, exponent-adjusting or truncating, operation on the accumulated depth error value, $\bar{e}_{depth,t}$, calculated by the accumulator 121 for a current control loop period, t. The bit shifting or truncation operation is effected by the configuration of the databus 123 as described above. For fine control of the read-out rate, the frequency of the control loop 100 should be relatively high so as to apply many small adjustments to the FIFO buffer 102 rather than fewer coarse adjustments. The smaller the interval between adjustments, the closer the control loop apparatus approximates to continuous time control.

The second register 126 stores a previous average depth error value, $\bar{e}_{depth,t}-1$, for an immediately preceding control loop period, t-1. Following the completion of one control loop period, the average depth error value corresponding to the control loop period is communicated via a data bus 123 to the first multiplication unit 132 and multiplied by a constant (step 208). Immediately prior to clocking the average depth error value, $\bar{e}_{depth,t}$, into the second register 126, the previous average depth error value, $\bar{e}_{depth,t}$, stored by the second register 126 is subtracted (step 210) from the average depth error value, $\Delta\bar{e}_{depth,t}$, held by the first register 120, and hence the accumulator 121, by the subtractor 138 to yield (step 208) a rate of change of depth error value, $\Delta\bar{e}_{depth}$:

$$\Delta\bar{e}_{depth} = \bar{e}_{depth,t} - \bar{e}_{depth,t-1},$$

that is communicated to the second multiplication unit 144. After execution of the subtraction, the content of the accumulator 121 is copied (step 210) to the second register 126.

The rate of change of depth error, $\Delta\bar{e}_{depth}$, is multiplied by a first constant (step 212) and the average depth error value, $\bar{e}_{depth,t}$, for the current control loop period, t, is multiplied by a second constant (step 214). Thereafter, the outputs of the first and second multiplication units 132, 144 are added together (step 216) so as to yield an adjustment value that is stored in the third register 162.

The values of the first and second constants employed can be varied to adjust the response of the control loop. Larger constant values can accommodate larger bursts of jitter and can correct the rates of data read out of the FIFO buffer 102 faster but will lead to greater jitter once the loop is regulated the read-out rate of the FIFO buffer 102. Small values for the first and second constants lead to better jitter performance but cause the capture time to be longer, i.e. the time taken for the control loop to regulate the read-out rate of the FIFO buffer 102. In this embodiment, the first and second constants were set to be integer powers of 2 in order to reduce the complexity of the hardware constituting the control loop, i.e. permitting bit-shifting or other suitable techniques to be employed. Additionally, the International Telecommunications Union (ITU) specification for jitter performance and capture speed is such that the first and second constants can be integer powers of 2 with the control loop falling outside the requirements of the specification.

The adjustment value can therefore be expressed algebraically as:

$$a\Delta\bar{e}_{depth} + b\ \bar{e}\bar{e}_{depth,\ t},$$

where "a" and "b" are the first and second constants.

Once the adjustment value has been calculated, the adjustment value is applied (step 218) to the second accumulator 175. Depending upon the output of the second adder 156, the adjustment value can be positive or negative. The value provided at the output port 176 of the fourth register 174 by the second accumulator 175 constitutes a frequency word proportional to the frequency of the read-out signal, which, in accordance with the mode of operation of the DDS of the read-out signal processing unit 180, is added to the DDS once every cycle of the system clock. Each time the DDS overflows, the DDS generates a carry bit. The repeated periodic generation of the carry bit constitutes a series of pulses which are the read-out signal.

Prior to being applied to the read clock port 186, the read-out signal can be pre-processed by the read-out signal processing circuit 180 in order to adjust the read-out signal in a desired way. For example, it can be desirable to read data out of the FIFO buffer 102 on a per-byte basis. In such a case, the read-out processing circuit 180 is arranged to divide the read-out signal generated by the DDS by 8.

Although the above examples have been described in the context of a SONET data stream, it should be appreciated that, with suitable adaptations, data stream complying with the SDH or PDH standards can be used. Additionally, although reference herein is made to integer powers of 2, it should be understood that integer powers of other numbers is contemplated, depending upon the number of states of logic being employed in the control loop apparatus. For example, if ternary logic is being used, integer powers of 3 are selected where appropriate.

What is claimed is:

1. A control loop apparatus having a control loop period associated therewith and employing n-state logic, the apparatus comprising:
   a first processing element for acquiring data at a rate determined by a predetermined clock signal, the data corresponding to a parameter to be controlled; and
   further processing elements arranged to generate a control signal in response to the acquired data;
   wherein the control loop period is a mathematical product of a period of the clock signal and a constant, the constant being the number of logic states of the n-state logic raised to a first integer power.

2. The apparatus according to claim 1, wherein the first processing element is further arranged to sum, or accumulate, the acquired data over the control loop period, thereby calculating an accumulated value.

3. The apparatus according to claim 2, wherein the first processing element and the further processing elements are arranged to manipulate the bits constituting the accumulated value, thereby averaging the accumulated value over the control loop period.

4. The apparatus according to claim 2, wherein the first processing element and the further processing elements are arranged to shift the bits constituting the accumulated value, thereby averaging the accumulated value over the control loop period.

5. The apparatus according to claim 2, wherein the first processing element and the further processing elements are arranged to truncate the bits constituting the accumulated value, thereby substantially averaging the accumulated value over the control loop period.

6. The apparatus according to claim 1, wherein the further processing elements are arranged to provide second order control.

7. The apparatus according to claim 2, wherein the further processing elements are arranged to calculate a rate of change of the accumulated value.

8. The apparatus according to claim 7, wherein the further processing elements are arranged to apply a derivative gain to the calculated rate of change of the accumulated value.

9. The apparatus according to claim 8, wherein the derivative gain corresponds to substantially the number of logic states raised to a second integer power.

10. The apparatus according to claim 2, wherein the further processing elements are arranged to apply a proportional gain to an average of the accumulated value, the average being over the control loop period.

11. The apparatus according to claim 10, wherein the proportional gain corresponds to substantially the number of logic states raised to a third integer power.

12. The apparatus according to claim 1, wherein the parameter to be controlled is a depth error of a First-In-First-Out (FIFO) buffer.

13. The apparatus according to claim 1,
   wherein the clock signal is a first clock signal, and
   wherein the control signal is used to control a period of a second clock signal.

14. In a control loop apparatus having a control loop period associated therewith and employing n-state logic, a method of operating the control loop apparatus, the method comprising the steps of:
    acquiring data at a rate determined by a predetermined clock signal, the data corresponding to a parameter to be controlled;
    generating a control signal in response to the acquired data; and
    setting the control loop period to be a mathematical product of a period of the clock signal and a constant, the constant being the number of logic states raised of the n-state logic to a first integer power.

15. The method according to claim 14, further comprising the step of:
    summing, or accumulating, the acquired data over the control loop period, thereby calculating an accumulated value.

16. The method according to claim 15, further comprising the step of:
    manipulating the bits constituting the accumulated value, thereby averaging the accumulated value over the control loop period.

17. The method according to claim 15, further comprising the step of:
    shifting the bits constituting the accumulated value, thereby averaging the accumulated value over the control loop period.

18. The method according to claim 15, further comprising the step of:
    truncating the bits constituting the accumulated value, thereby substantially averaging the accumulated value over the control loop period.

19. The method according to claim 14, further comprising the step of:
    providing second order control.

20. The method according to claim 15, further comprising the step of:
    calculating a rate of change of the accumulated value.

21. The method according to claim 20, further comprising the step of:
    applying a derivative gain to the calculated rate of change of the accumulated value.

22. The method according to claim 21, wherein the derivative gain corresponds to substantially the number of logic states raised to a second integer power.

23. The method according to claim 15, further comprising the step of:
    applying a proportional gain to an average of the accumulated value, the average being over the control loop period.

24. The method according to claim 23, wherein the proportional gain corresponds to substantially the number of logic states raised to a third integer power.

25. The method according to claim 14, wherein the parameter to be controlled is a depth error of a First-In-First-Out (FIFO) buffer.

26. The method according to claim 14,
    wherein the clock signal is a first clock signal, and
    wherein the method further comprises the step of:
    using the control signal to control a period of a second clock signal.

* * * * *